US009136082B2

United States Patent
Li et al.

(10) Patent No.: US 9,136,082 B2
(45) Date of Patent: Sep. 15, 2015

(54) GROUND-FAULT CIRCUIT INTERRUPTER

(71) Applicants: Chengli Li, Suzhou (CN); Guolan Yue, Suzhou (CN)

(72) Inventors: Chengli Li, Suzhou (CN); Guolan Yue, Suzhou (CN)

(73) Assignee: Chengli Li, Shuzhou (CN)

( * ) Notice: Subject to any disclaimer, the term of this patent is extended or adjusted under 35 U.S.C. 154(b) by 13 days.

(21) Appl. No.: 14/019,414

(22) Filed: Sep. 5, 2013

(65) Prior Publication Data

US 2014/0340798 A1    Nov. 20, 2014

(51) Int. Cl.
*H01H 83/02* (2006.01)
(52) U.S. Cl.
CPC ..................... *H01H 83/02* (2013.01)
(58) Field of Classification Search
CPC ........................................................ H01H 83/02
USPC ............................................................. 361/42
See application file for complete search history.

(56) References Cited

U.S. PATENT DOCUMENTS

| | | | | |
|---|---|---|---|---|
| 5,177,657 A | * | 1/1993 | Baer et al. | 361/45 |
| 2002/0166541 A1 | * | 11/2002 | Yamakado et al. | 123/490 |
| 2012/0229943 A1 | * | 9/2012 | Ward | 361/62 |

* cited by examiner

*Primary Examiner* — Scott Bauer
(74) *Attorney, Agent, or Firm* — Chen Yoshimura LLP

(57) ABSTRACT

A ground-fault circuit interrupter (GFCI) device, including a relay for control a switch to be in an open position or a closed position, the relay including a first coil and a second coil, wherein when both the first coil and the second coil are non-conductive, the switch is caused to be in the open position. The GFCI also includes a relay start circuit connected to the first coil for causing the first coil to be conductive or non-conductive, wherein when the first coil is conductive, the first coil causes the switch to be in the closed position, but after the first coil is conductive, the coil start circuit becomes non-conductive. The GFCI further includes a relay sustain circuit connected to the second coil for causing the second coil to be conductive or non-conductive. In addition, the GFCI includes a ground fault detect circuit for causing both the relay start circuit and the relay sustain circuit to become non-conductive when a fault signal is detected, causing both the first coil and the second coil to be non-conductive, thereby causing the switch to be in the open position.

20 Claims, 1 Drawing Sheet

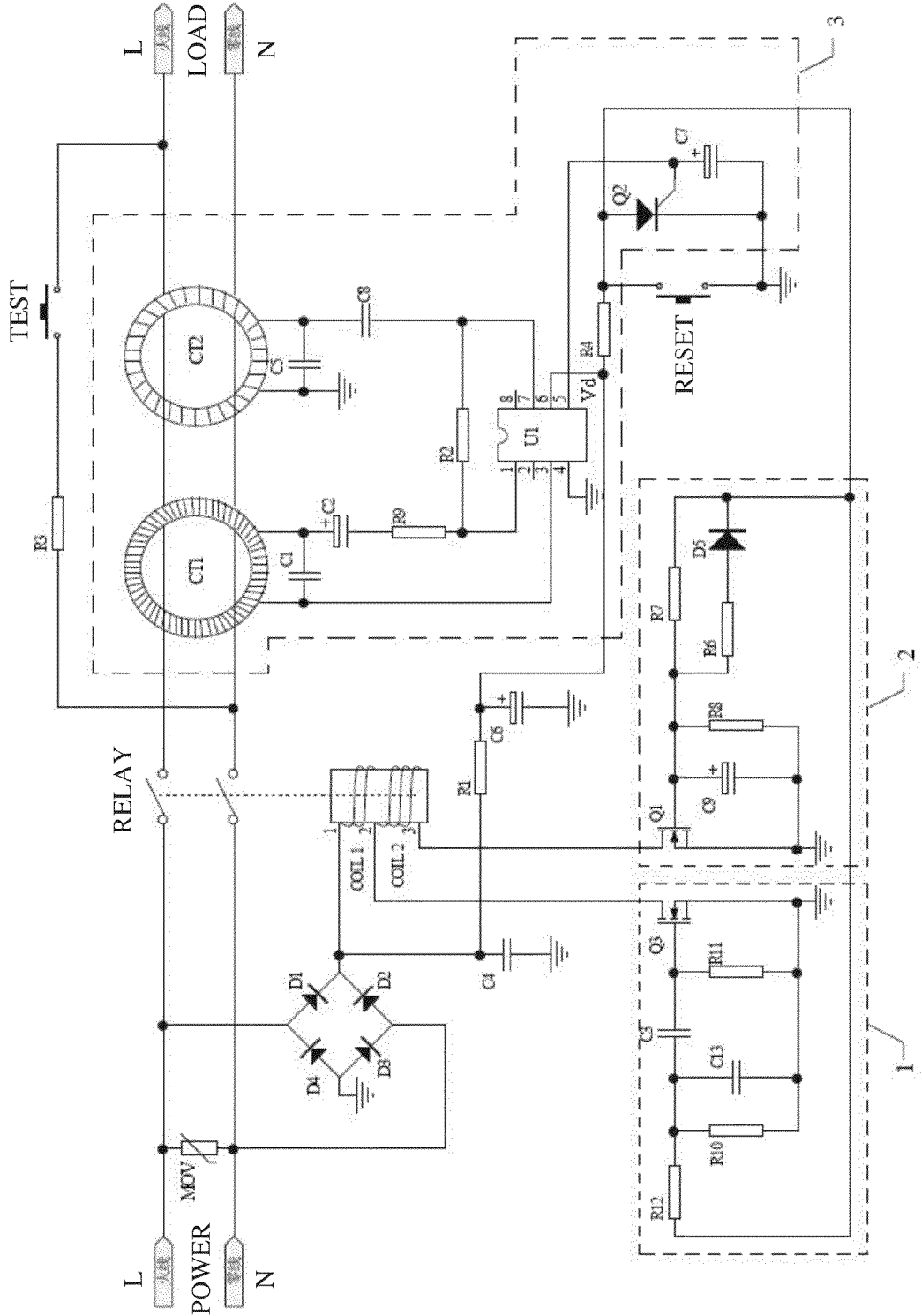

GROUND-FAULT CIRCUIT INTERRUPTER

This application claims foreign priority benefits under 35 U.S.C. §119(a)-(d) from China Patent Application No. 201310185866.X, filed May 20, 2013, which is incorporated by reference in its entirety.

BACKGROUND OF THE INVENTION

1. Field of the Invention

This invention relates to electrical safety protection, and in particular, it relates to a power plug or receptacle with a ground-fault circuit interrupter (GFCI) device utilizing a relay mechanism to reset the GFCI device.

2. Description of the Related Art

Currently, to ensure safety in using electrical household appliances, the input side of the household appliances is usually provided with a power plug or receptacle having a ground-fault circuit interrupter (GFCI) device. Traditional GFCI devices have utilized mechanical reset mechanisms, wherein after reset, in an electrically disconnected state, the GFCI device remains in a reset state, i.e., the switch between the input and output terminals remains closed. However, at this state, if the hot wire of the input terminal is provided with electrical power, then the output terminal of the device will still have power, which presents a personal safety danger to the user.

Some other traditional GFCI devices utilize relay reset mechanisms but the spacing of the switch contacts between the electrical conductors of the input and output conducting path cannot be too large, otherwise the switch cannot be electromagnetically pulled to close. To solve this problem some existing GFCI devices with relay reset mechanisms apply larger electrical current to the relay, so that even switches with large spacing may be electromagnetically pulled to close. But when these types of GFCI devices are powered on for an extended period of time, the coils of the relays will heat up significantly, seriously increasing the risk of fire hazard.

Therefore, it is desirable to provide a new relay reset circuit design for GFCI devices, which can ensure that even when one of the input terminals is provided with electrical power, the output or load terminals still has no power, and which can also ensure that the switch can be reliably pulled to close electromagnetically while the spacing of the switch contacts can still be increased, so that the relay mechanism can function normally and the personal safety of the users are protected.

SUMMARY OF THE INVENTION

The object of the present invention is to provide a more reliable and safe GFCI device that overcomes the drawbacks of conventional technologies.

To achieve this and other objects, the present invention provides a GFCI device with a new relay reset circuit design that can ensure that even when one of the input terminals is provided with electrical power, the output or load terminals still has no power, and which can also ensure that the switch between the input and output electrical conducting paths can be reliably pulled to close electromagnetically even with increased spacing between the switch contacts, so that the relay mechanism can function normally to protect the personal safety of the users.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a ground-fault circuit interrupter (GFCI) device having a relay for control a switch to be in an open position or a closed position, the relay including a first coil and a second coil, wherein when both the first coil and the second coil are non-conductive, the switch is caused to be in the open position. The GFCI also has a relay start circuit connected to the first coil for causing the first coil to be conductive or non-conductive, wherein when the first coil is conductive, the first coil causes the switch to be in the closed position, but after the first coil is conductive, the coil start circuit becomes non-conductive. The GFCI further has a relay sustain circuit connected to the second coil for causing the second coil to be conductive or non-conductive. In addition, the GFCI has a ground fault detect circuit for causing both the relay start circuit and the relay sustain circuit to become non-conductive when a fault signal is detected, causing both the first coil and the second coil to be non-conductive, thereby causing the switch to be in the open position.

In a preferred embodiment of the present invention, the ground fault detect circuit of the GFCI device is connected to a reset button, wherein when the reset button is pressed down, the relay start circuit and the relay sustain circuit causes the first coil and the second coil to be electrically powered, thereby causing the switch to be in its closed position.

In addition, the GFCI device also has a power supply circuit for providing a direct current power to the relay start circuit, relay sustain circuit, and the ground fault detect circuit.

In the preferred embodiment of the present invention, the relay sustain circuit of the GFCI device is connected to the ground fault detect circuit, and the relay sustain circuit further includes a first switching element having its drain connected to the second coil.

Also, in the preferred embodiment of the present invention, the ground fault detect circuit of the GFCI device includes a second switching element connected to a reset button of the GFCI device.

Furthermore, in the preferred embodiment of the present invention, the relay start circuit is connected to the ground fault detect circuit, and the relay start circuit further includes a third switching element having its drain connected to the first coil.

The present invention has the following advantages: the reset mechanism of the GFCI devices made pursuant to the present invention has sufficient safety spacing between the relay switch contacts when the relay switch is open, and after reset, even when the relay is electrically powered for a long period of time, the heat generated by the relay coils can be maintained within a safe range, effectively ensuring the safety of using electrical power.

It is to be understood that both the foregoing general description and the following detailed description are exemplary and explanatory and are intended to provide further explanation of the invention as claimed.

BRIEF DESCRIPTION OF THE DRAWINGS

The features and advantages of the preferred embodiment of the present invention can be further understood from the detailed description below with reference to the following drawing:

FIG. 1 is a circuit diagram of a GFCI device according to a preferred embodiment of the present invention.

DETAILED DESCRIPTION OF THE PREFERRED EMBODIMENTS

The purpose of the present invention is to provide an easy and reliable method, using a relay reset feature in a GFCI device, increasing the spacing between the usually-open contacts of the relay switch to ensure a safety distance, while maintaining the normal functions of the relay mechanism.

To achieve the above stated purposes, the present invention utilizes a design approach as described below: the relay mechanism has two sets of relay assemblies to accomplish a switch reset process of the relay mechanism. The first set of relay assembly creates a relatively strong electromagnetic field inside the coils of the relay, so that the metal core inside the relay can move rapidly under the magnetic force, to cause the switch between the input and output electrical conducting paths to close. When the switch is closed, the electrical power to the driving circuit of the first set of relay assembly is terminated. The second set of relay assembly uses a relatively small electrical current to create a magnetic field to sustain the switch in the closed (or reset) state.

Specifically, the circuitry of the GFCI device of the present invention is shown in FIG. 1. The GFCI device has input terminals that include a phase (or hot) conductor L and a neutral conductor N. The GFCI device also has output or load terminals that also include a phase (or hot) terminal L and a neutral conductor N. The GFCI device further has a switch placed in the conducting paths of the input and output terminals. The contacts of the switch are respectively connected to the hot and neutral conductors of the input and output terminals. When the switch is switched to a first position, its contacts are closed and the respective hot and neutral conductors of the input and output terminals are electrically connected. When the switch is set at a second position, its contacts are opened and the respective hot and neutral conductors of the input and output terminals are electrically disconnected.

The switch is controlled by two sets of relay assemblies. The relay has a first coil COIL1 and a second coil COIL2. The first coil COIL1 and a relay start circuit 1 form the first set of relay assemblies, and the second coil COIL2 and a relay sustain circuit 2 form the second set of relay assemblies. When the coils are in a conducting state, i.e., electrical power is provided to the coils, the switch is pulled electromagnetically to its first or closed position, and the output or load terminals have power output. When both COIL1 and COIL2 are in a non-conducting state, i.e., electrical power is no longer provided to the coils, the switch returns to its second position, and the output or load terminals have no power output.

The conduction status of COIL1 is controlled by the relay start circuit 1, and the conduction status of COIL2 is controlled by the relay sustain circuit 2. Coil 1 and COIL2 may be conducting at the same time, or COIL1 may be conducting prior to COIL2. The movable metal core of the coils causes the switch to move from the second position to the first position. When the movable metal core and the fix metal core of the relay join, the switch reaches the first position, and the output or load terminals have power output. At this time the start circuit 1 of the relay stops to provide power to COIL1, and the sustain circuit 2 of the relay maintains power to keep COIL2 conducting which in turn keeps the cores of the coils together, so that the switch is kept at its closed state, i.e., the hot and neutral conductors of the input and output terminals are still electrically connected.

The start circuit 1 and the sustain circuit 2 are both connected to a ground fault detect circuit 3. When the ground fault detect circuit 3 detects a ground or other fault signal, the silicon controlled rectifier (SCR) Q2 becomes conductive, which short-circuits the working power of both the relay start circuit 1 and relay sustain circuit 2. At this time COIL1 and COIL2 are both non-conductive as there is no current passing the coils, so the switch returns from the first position to the second position, i.e., the electrical conducting path from the power source input to the output or load is disconnected.

The power supply circuit of the relay provides direct current (DC) voltage to the relay start circuit 1, the relay sustain circuit 2 and the ground fault detect circuit 3.

Coils COIL1 and COIL2 may be two windings of the relay coil overlapped and wounded on the same coil support frame and sharing the same related action members such as the relay core, the yoke, the armature, etc.

Coil COIL1 is a start-pull winding, with fewer turns and a thicker diameter, and also has a larger current flow when powered or energized to generate a greater electromagnetic field to cause the internal movable iron core to move along the magnetic field lines, thereby pull the switch to close, such that the hot and neutral conductors of the input and output terminals are electrically connected, so that the output or load terminals have power.

Coil COIL2 is a sustain-pull winding, with more turns and a thinner diameter, and also has a smaller current flow for maintaining the electromagnetic field to keep the switch in the closed state. Since coil COIL2 has more winding turns and a thinner diameter, it has a larger internal resistance, and lower heat generation, to provide a higher reliability for working in longer periods of time. It is understood that coil COIL2 is a relative concept. It can be a coil completely independent of COIL1 so they are two separate windings each performing its own respective functions. Alternatively, coil COIL2 may be assembled in series with coil COIL1 to perform the pull-keeping function. In other word, coil COIL1 may participate in the pull-start functionality and also the pull-keeping functionality.

The ground fault detect circuit is shown in dotted box 3, includes sensing transformers CT1 and CT2, capacitors C1, C2, C5, C7 and C8, resistors R2, R4 and R9, SCR Q2 and integrated circuit (IC) chip U1, and provides the function of ground fault detection. When the sensing transformers detect a ground or other fault signal, IC U1 outputs a driving signal to trigger SCR Q2 to become conductive, cutting off electrical power for COIL1 and COIL2, so that the electromagnetic field inside the coils disappears, causing the switch to return from the first (close) position to the second (open) position, such that the hot and neutral conductors of the input and output terminals are electrically disconnected, so that the output or load terminals have no electrical power.

The power voltage is rectified by a bridge circuit D1~D4, whereupon the current is limited by resistor R1, and the voltage is stabilized and filtered by gate 6 of the IC U1, so that stable DC voltage Vd is provided at the left side of resistor R4, as the working power for the relay start circuit 1, relay sustain circuit 2 and ground fault detect circuit 3.

The following description uses the sample of coils COIL1 and COIL2 assembled in series to form a relay coil to explain in detail how to implement the new GFCI design scheme disclosed by the present invention.

Relay start circuit (dotted box 1): at the initial stage of the relay resetting, voltage Vd is divided by resistor R2, R12 and R10 and rectified by capacitor C13, to provide a low voltage signal. The differential signal of capacitor C3 and resistor R11 drives a switching element Q3 (which for example may be a field-effect transistor or "FET") to become conductive, providing electrical power to coil COIL1, such that its windings has a large current flow, so that the switch is pulled electromagnetically from its second, i.e. open, position to its first, i.e. closed, position. When the differential signal is ended, switching element Q3 becomes non-conductive. However, coil COIL1 may still be conductive through coil COIL2 and a switching element Q1 (which for example may also be an FET). Yet since the effective serial resistance of coil COIL1 is increased, the current flow in coil COIL1 is reduced to lower its heat generation.

Relay sustain circuit (dotted box 2): coil COIL1 is at the initial stage of the relay resetting, voltage Vd is divided by resistor R4, R7 and R8 and delay-rectified by capacitor C9, to provide a low voltage signal, directly driving the gate of the switching element Q3 to become conductive, providing electrical power to coil COIL2, such that its windings has a small current flow, to sustain the switch at its first, i.e. closed, position.

Ground fault detect circuit (dotted box 3): when there is a ground or other fault signal, SCR Q2 becomes conductive, causing the voltage at the right side of resistor R4 to be zero, the gate voltage of switching element Q1 discharges through diode D5, resistor R6 and switching element Q2, such that switching element Q1 becomes non-conductive, causing coils COIL1 and COIL2 to lose power so their electromagnetic fields disappears. As a result the switch returns from its first, i.e. closed, position to its second, i.e. open, position, such that the hot and neutral conductors of the input and output terminals are electrically disconnected.

When the reset button is pressed down, switching element Q2 is switched off and becomes non-conductive, the voltage at the right side of resistor R4 increases, the differential signal of capacitor C3 and resistor R11 drives switching element Q3 to become conductive. As a result coil COIL1 has power, pulling the switch to move from its second, i.e. open, position to its first, i.e. closed, position, providing electrical power at the output or load terminals. At the same time, resistors R7 and R8 divide voltage to drive switching element Q1 to become conductive, providing electrical power to coil COIL2 to sustain the relay, thereby keeping the switch in its closed state.

The GFCI device provided by the present invention has the following advantages: the reset mechanism of the GFCI devices implementing the present invention has sufficient safety spacing when the relay switch is opened, and after resetting, the heat generated by the relay coil can be maintained within a safe range even when the relay is powered for a long period of time, effectively ensuring electrical power usage safety.

It will be apparent to those skilled in the art that various modification and variations can be made in the power receptacle of the present invention without departing from the spirit or scope of the invention. Thus, it is intended that the present invention cover modifications and variations that come within the scope of the appended claims and their equivalents.

What is claimed is:

1. A ground-fault circuit interrupter (GFCI) device, comprising:
   a relay for control a switch to be in an open position or a closed position, the relay including a first coil and a second coil, wherein when both the first coil and the second coil are non-conductive, the switch is caused to be in the open position;
   a relay start circuit connected to the first coil for causing the first coil to be conductive or non-conductive, wherein when the first coil is conductive, the first coil causes the switch to be in the closed position;
   a relay sustain circuit connected to the second coil for causing the second coil to be conductive or non-conductive; and
   a ground fault detect circuit for causing both the relay start circuit and the relay sustain circuit to become non-conductive when a fault signal is detected, causing both the first coil and the second coil to be non-conductive, thereby causing the switch to be in the open position.

2. The GFCI device of claim 1, wherein the ground fault detect circuit is connected to a reset button, wherein when the reset button is pressed down, the relay start circuit and the relay sustain circuit causes the first coil and the second coil to be conductive, thereby causing the switch to be in the closed position.

3. The GFCI device of claim 2, wherein the ground fault detect circuit further comprises a second switching element connected to the reset button.

4. The GFCI device of claim 1, wherein the relay start circuit is connected to the ground fault detect circuit, and further comprises:
   a third switching element connected to the first coil,
   a first voltage divider circuit connected between a DC supply and a ground,
   a first capacitor connected between an output voltage of the first voltage divider circuit and the ground,
   a second capacitor connected between the output voltage of the first voltage divider circuit and a control gate of the third switching element, and
   a resistor connected between the control gate of the third switching element and the ground, wherein a differential signal of the second capacitor and the resistor drives the third switching element.

5. The GFCI device of claim 4, wherein the relay sustain circuit is connected to the ground fault detect circuit, and further comprises:
   a first switching element connected to the second coil,
   a second voltage divider circuit connected between the DC supply and the ground, an output voltage of the second voltage divider circuit being connected to a control gate of the first switching element, and
   a third capacitor connected between the control gate of the first switching element and the ground for delay-rectifying the output voltage of the second voltage divider circuit.

6. The GFCI device of claim 1, wherein the first coil has less winding turns than the second coil, but the first coil has a winding diameter not less than a winding diameter of the second coil.

7. The GFCI device of claim 1, wherein the first coil and the second coil are connected in series.

8. A ground-fault circuit interrupter (GFCI) device, comprising:
   a relay for control a switch to be in an open position or a closed position, the relay including a first coil and a second coil, wherein when both the first coil and the second coil are non-conductive, the switch is caused to be in the open position;
   a relay start circuit connected to the first coil for causing the first coil to be conductive or non-conductive, wherein when the first coil is conductive, the first coil causes the switch to be in the closed position, but after the first coil is conductive, the coil start circuit becomes non-conductive, thereby causing the first coil to become non-conductive;

a relay sustain circuit connected to the second coil for causing the second coil to be conductive or non-conductive, wherein after the switch is in the closed position and the second coil is conductive, the second coil sustains the switch at the closed position even when the first coil becomes non-conductive; and a ground fault detect circuit for causing both the relay start circuit and the relay sustain circuit to become non-conductive when a fault signal is detected, causing both the first coil and the second coil to be non-conductive, thereby causing the switch to be in the open position.

9. The GFCI device of claim 8, wherein the ground fault detect circuit is connected to a reset button, wherein when the reset button is pressed down, the relay start circuit and the relay sustain circuit causes the first coil and the second coil to be conductive, thereby causing the switch to be in the closed position.

10. The GFCI device of claim 9, wherein the ground fault detect circuit further comprises a second switching element connected to the reset button.

11. The GFCI device of claim 8, wherein the relay start circuit is connected to the ground fault detect circuit, and further comprises:
   a third switching element connected to the first coil;
   a first voltage divider circuit connected between a DC supply and a ground,
   a first capacitor connected between an output voltage of the first voltage divider circuit and the ground,
   a second capacitor connected between the output voltage of the first voltage divider circuit and a control gate of the third switching element, and
   a resistor connected between the control gate of the third switching element and the ground, wherein a differential signal of the second capacitor and the resistor drives the third switching element.

12. The GFCI device of claim 11, wherein the relay sustain circuit is connected to the ground fault detect circuit, and further comprises:
   a first switching element connected to the second coil,
   a second voltage divider circuit connected between the DC supply and a ground, an output voltage of the second voltage divider circuit being connected to a control gate of the first switching element, and
   a third capacitor connected between the control gate of the first switching element and the ground for delay-rectifying the output voltage of the second voltage divider circuit.

13. The GFCI device of claim 8, wherein the first coil has less winding turns than the second coil, but the first coil has a winding diameter not less than a winding diameter of the second coil.

14. The GFCI device of claim 8, wherein the first coil and the second coil are connected in series.

15. A ground-fault circuit interrupter (GFCI) device, comprising:
   a relay for control a switch to be in an open position or a closed position, the relay including a first coil and a second coil, wherein when both the first coil and the second coil are non-conductive, the switch is caused to be in the open position;
   a relay start circuit connected to the first coil for causing the first coil to be conductive or non-conductive, wherein when the first coil is conductive, the first coil causes the switch to be in the closed position;
   a relay sustain circuit connected to the second coil for causing the second coil to be conductive or non-conductive, wherein after the switch is in the closed position and the second coil is conductive, the second coil sustains the first coil to be still conductive albeit with a reduced current flow, thereby sustaining the switch at the closed position while reducing heat generation by the first coil; and
   a ground fault detect circuit for causing both the relay start circuit and the relay sustain circuit to become non-conductive when a fault signal is detected, causing both the first coil and the second coil to be non-conductive, thereby causing the switch to be in the open position.

16. The GFCI device of claim 15, wherein the ground fault detect circuit is connected to a reset button, wherein when the reset button is pressed down, the relay start circuit and the relay sustain circuit causes the first coil and the second coil to be conductive, thereby causing the switch to be in the closed position.

17. The GFCI device of claim 16, wherein the ground fault detect circuit further comprises a second switching element connected to the reset button.

18. The GFCI device of claim 15, wherein the relay start circuit is connected to the ground fault detect circuit, and further comprises:
   a third switching element connected to the first coil
   a first voltage divider circuit connected between a DC supply and a ground,
   a first capacitor connected between an output voltage of the first voltage divider circuit and the ground,
   a second capacitor connected between the output voltage of the first voltage divider circuit and a control gate of the third switching element, and
   a resistor connected between the control gate of the third switching element and the ground, wherein a differential signal of the second capacitor and the resistor drives the third switching element.

19. The GFCI device of claim 18, wherein the relay sustain circuit is connected to the ground fault detect circuit, and further comprises:
   a first switching element connected to the second coil
   a second voltage divider circuit connected between the DC supply and the ground, an output voltage of the second voltage divider circuit being connected to a control gate of the first switching element, and
   a third capacitor connected between the control gate of the first switching element and the ground for delay-rectifying the output voltage of the second voltage divider circuit.

20. The GFCI device of claim 15, wherein the first coil and the second coil are connected in series.

* * * * *